United States Patent
Swamy et al.

(10) Patent No.: US 11,404,991 B2
(45) Date of Patent: Aug. 2, 2022

(54) VARIABLE FREQUENCY DRIVE DC BUS CAPACITOR CONFIGURATION TO LIMIT DC BUS SHORT CIRCUIT CURRENT

(71) Applicant: YASKAWA AMERICA, INC., Waukegan, IL (US)

(72) Inventors: Mahesh M. Swamy, Gurnee, IL (US); Nathan T. Seipel, Silver Lake, WI (US)

(73) Assignee: Yaskawa America, Inc., Waukegan, IL (US)

( * ) Notice: Subject to any disclaimer, the term of this patent is extended or adjusted under 35 U.S.C. 154(b) by 0 days.

(21) Appl. No.: 17/143,254

(22) Filed: Jan. 7, 2021

(65) Prior Publication Data

US 2021/0218359 A1 Jul. 15, 2021

Related U.S. Application Data

(60) Provisional application No. 62/959,276, filed on Jan. 10, 2020.

(51) Int. Cl.
*H02P 1/00* (2006.01)
*H02P 27/08* (2006.01)
*H02P 29/02* (2016.01)
*H02M 5/458* (2006.01)

(52) U.S. Cl.
CPC .......... *H02P 27/08* (2013.01); *H02M 5/458* (2013.01); *H02P 29/02* (2013.01)

(58) Field of Classification Search
CPC .......... H02P 27/08; H02P 29/02; H02P 27/06; H02P 27/047; H02P 29/027; H02M 5/458
See application file for complete search history.

(56) References Cited

U.S. PATENT DOCUMENTS

| | | | |
|---|---|---|---|
| 7,054,173 B2 | 5/2006 | Rayner et al. | |
| 2017/0159656 A1* | 6/2017 | Tientcheu-Yamdeu | F04C 2/1071 |

FOREIGN PATENT DOCUMENTS

CN 215343930 U * 12/2021

* cited by examiner

*Primary Examiner* — Karen Masih
(74) *Attorney, Agent, or Firm* — Wood, Phillips, Katz, Clark & Mortimer

(57) ABSTRACT

A voltage source inverter comprises a rectifier circuit having an input for connection to a multi-phase AC power source and converting the AC power to DC power and an inverter circuit for receiving DC power and converting the DC power to AC power. A DC bus circuit is connected between the rectifier circuit and the inverter circuit to provide a relatively fixed DC voltage for the inverter circuit, the DC bus circuit comprising a DC bus including a first bus rail comprising an inductor and a second bus rail, and a soft charge circuit connected in series with a DC bus capacitor network between the first and second rails, the DC bus capacitor network comprising a first capacitor branch including a pair of capacitors with a fuse connected in series between the capacitors, a balancing resistor across each capacitor and a snubbing capacitor connected across the fuse.

19 Claims, 3 Drawing Sheets

VARIABLE FREQUENCY DRIVE DC BUS CAPACITOR CONFIGURATION TO LIMIT DC BUS SHORT CIRCUIT CURRENT

CROSS-REFERENCE TO RELATED APPLICATIONS

This application claims priority of provisional application No. 62/959,276, filed Jan. 10, 2020.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to variable frequency drives and, more particularly, to limiting short circuit current.

BACKGROUND

Variable Frequency Drives (VFDs) with diode rectifier front ends are typically equipped with a resistor-contactor arrangement to limit the inrush current into the DC bus capacitors, thereby providing a means for soft charging the DC bus capacitors.

AC to DC rectifiers are widely used to convert AC line electric power to DC power to be used by inverters (for motor, UPS, and other applications), DC/DC converters, and passive loads such as resistors. In any rectifier circuit, the AC line voltages are rectified, and ripple of the rectified voltage is filtered using a parallel capacitor and occasionally a series inductor. This results in a fixed, i.e., ripple free, DC voltage.

The testing protocol detailed in UL 61800-5-1 requires all VFDs with DC bus capacitors to undergo a capacitor short circuit test. As mentioned, it is recognized that all VFDs are typically equipped with a resistor contactor arrangement to limit the inrush current into the DC bus capacitors. Attempts to open this contactor on sensing a DC bus capacitor fault condition has not been met with success because the current flowing through the contactor during fault is inductive and is difficult to interrupt. Even if the contactor is opened, the fault current will then flow through the soft charge resistor creating heat and potentially causing the cotton wrapped around the drive during the test to catch fire. The electrical position of this contactor is recognized to be a potential area for improvement.

Known voltage source inverters (VSI) that have a large DC bus capacitor filter use a resistor-contactor arrangement to limit the inrush current into the capacitors, and thereby provide a means to soft-charge the DC bus capacitor $C_{DC}$, see FIG. 1(a). Because of the mechanical nature of the contactor, the reliability of the variable frequency drive (VFD) is adversely affected. Moreover, given the fact that the current through the contactor is inductive in nature and any resistor-contactor arrangement has an inherent time delay in its basic response, an unfavorable sequence of events may occur during a brown out condition.

The typical prior art VFD system shown in FIG. 1(a) employs the soft charge circuit including a resistor $R_{SC}$ and a contactor switch MC connected in parallel. The resistor $R_{SC}$ is sized for the start-up charging transient while the contactor switch MC is sized for the normal operation. During start-up the contactor switch MC is open (not conducting) and it remains so until the DC bus capacitor voltage reaches a critical value (roughly near rated operating voltage). Once the critical voltage level is reached, then the contactor switch MC is closed, and the resistor $R_{SC}$ is by-passed.

The rectifier system of FIG. 1(a) exhibits high energy-efficiency because the contactor switch MC has very low conduction losses and the large pre-charge transients are limited to less harmful levels. If for any reason the input AC supply experiences a large dip either due to brown out condition or due to a large load being suddenly applied across the AC supply, there is a possibility that the soft-charge contactor does not open and remains closed. When the input AC supply recovers, the resulting surge current can be large and damage the input rectifiers, and the DC bus capacitor. When large current flows through the soft charge contactor during such events, the contacts can even melt and fuse together, rendering them useless for future use. Hence, by nature, this approach does not yield a highly reliable solution. Also, due to mechanical actuation, the mechanical contactor switch wear-out is rapid and inevitable. Therefore, the life of the contactor is limited and in general much shorter than most of the stationary electrical parts inside a rectifier system.

There have been suggestions of replacing the magnetic contactor (MC in FIG. 1(a)) with a thyristor, see FIG. 1(b). However, the semiconductor switch requires control and is associated with steady-state power loss.

Advantageously, alternate soft charge techniques would provide additional features such as: meeting the UL testing guideline that requires shorting half DC bus without igniting cotton; avoiding paralleling of mechanical contactors; handling brown out conditions in an efficient manner; the unit should be compact and economical; and the topology should be able to substitute mechanical parts with semiconductors without significantly increasing steady state loss.

The present invention is directed to satisfying the requirements discussed above, in a novel and simple manner.

SUMMARY

As described herein, a variable frequency drive includes a DC bus capacitor configuration to limit DC bus short circuit current.

Broadly, there is disclosed herein a voltage source inverter comprising a rectifier circuit having an input for connection to a multi-phase AC power source and converting the AC power to DC power and an inverter circuit for receiving DC power and converting the DC power to AC power. A DC bus circuit is connected between the rectifier circuit and the inverter circuit to provide a relatively fixed DC voltage for the inverter circuit, the DC bus circuit comprising a DC bus including a first bus rail comprising an inductor and a second bus rail, and a soft charge circuit connected in series with a DC bus capacitor network between the first and second rails, the DC bus capacitor network comprising a plurality of parallel pairs of series connected capacitors.

It is a feature that the DC bus capacitor network comprises two parallel pairs of series connected capacitors.

It is another feature that the DC bus capacitor network comprises three or more parallel pairs of series connected capacitors.

It is a further feature that each pair of series connected capacitors comprises a midpoint and the midpoint of each pair is connected to create a common midpoint.

It is another feature that each pair of series connected capacitors comprises a midpoint and the midpoint of each pair is not connected to the midpoint of the other pairs.

It is an additional feature that each pair of series connected capacitors comprises a fuse connected between the capacitors. A balancing resistor may be connected across each capacitor.

It is yet another feature that a snubber capacitor is connected across each of the fuses.

There is disclosed in accordance with another aspect a voltage source inverter comprising a rectifier circuit having an input for connection to a multi-phase AC power source and converting the AC power to DC power and an inverter circuit for receiving DC power and converting the DC power to AC power. A DC bus circuit is connected between the rectifier circuit and the inverter circuit to provide a relatively fixed DC voltage for the inverter circuit, the DC bus circuit comprising a DC bus including a first bus rail comprising an inductor and a second bus rail, and a soft charge circuit connected in series with a DC bus capacitor network between the first and second rails, the DC bus capacitor network comprising a first capacitor branch including a pair of capacitors with a fuse connected in series between the capacitors, a balancing resistor across each capacitor and a snubbing capacitor connected across the fuse.

It is another feature that the DC bus capacitor network comprises a second capacitor branch in parallel with the first capacitor branch. A third capacitor branch, or more, may be connected in parallel with the first and second capacitor branches.

There is also disclosed herein a variable frequency drive comprising a variable frequency drive comprising a diode rectifier receiving multi-phase AC power from a source and converting the AC power to DC power, an inverter for receiving DC power and converting DC power to AC power to drive a load, and a DC bus connected between the diode rectifier and the inverter to provide a relatively fixed DC voltage for the inverter. A soft charge circuit is connected in series with a DC bus capacitor network across the DC bus, the DC bus capacitor network comprising a plurality of parallel pairs of series connected capacitors.

Other features and advantages will be apparent from a review of the entire specification, including the appended claims and drawings.

DETAILED DESCRIPTION

An important requirement of the present invention is that any suggestion of improving the performance of a variable frequency drive (VFD) to meet the requirements discussed above should not require significant changes and hence not add significant cost to the existing VFD topology. This is an important constraint since it will help maintain the size of the existing VFD frame and will require less product development time to implement the suggested changes. There are four aspects of reconfigurations discussed below to meet the desired features listed earlier. They are: move the magnetic contactor (MC) and soft-charge resistor in series with the bus capacitor; remove the DC bus common midpoint; fuse each branch of the DC bus; and add a snubber capacitor across each bus fuse.

Figure 2:
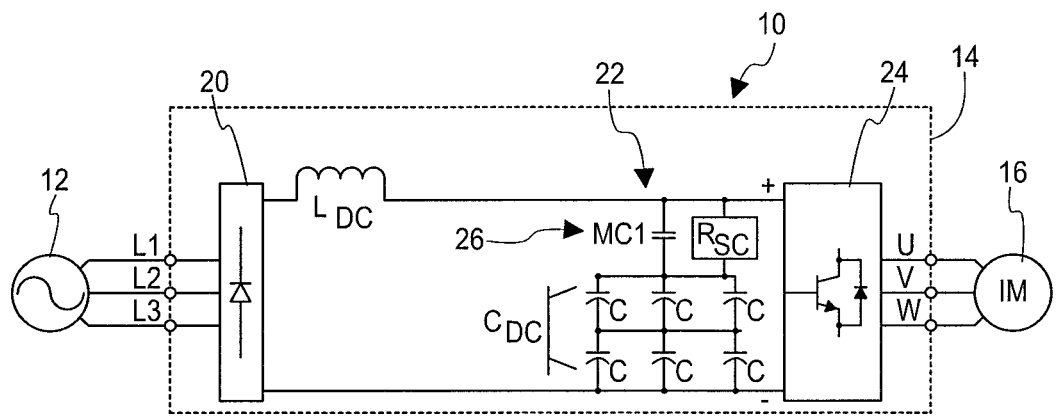
FIG. 2 is a schematic of a VFD in accordance with the invention with a repositioned soft charge resistor contactor arrangement.

Referring initially to FIG. 2, a motor drive system 10 is illustrated. The motor drive system 10 includes an AC source 12 and a variable frequency drive (VFD) 14 for driving load in the form of an induction motor 16. As is known, a control unit (not shown) would be used for controlling the VFD 14. However, such control unit is not shown herein as it does not itself form part of the invention. Instead, the invention relates particularly to the reconfiguration discussed above.

The AC source 12 may comprise any source developing three phase AC power connected to input line terminals labeled L1, L2 and L3. The VFD 14, as described more particularly below, converts the AC power to DC power and converts it back to AC power at a select frequency which is then impressed across terminals U, V and W. The terminals U, V and W are connected to feeder conductors to drive the motor 16, as is known.

The VFD 14 includes an AC/DC converter 20 connected by a DC bus circuit 22 to a DC/AC converter 24. In an illustrative embodiment of the invention, the AC/DC converter 20 comprises a full wave bridge rectifier circuit of conventional construction which is operable to convert three phase AC power at input terminals L1, L2 and L3, to DC power at an output connected to the DC bus circuit 22. Particularly, the AC/DC converter 20 comprises a diode rectifier. Other types of full wave bridge rectifier circuits may be used. The DC bus 22 is defined by rails labeled "+" and "−". An inductor $L_{dc}$ is connected in the +rail. A soft charge circuit 26 and a DC bus capacitor network $C_{dc}$ are connected in series across the DC bus 22. The soft charge circuit 26 comprises a contactor MC1 and parallel resistor $R_{sc}$. The DC bus capacitor network $C_{dc}$ comprises three parallel pairs of series connected capacitors C, with the midpoints connected. It should be noted that the DC bus capacitor network $C_{dc}$ could include more than three parallel pairs of series connected capacitors without departing from the scope of the invention.

The DC/AC converter 24 comprises an inverter section. Typically, the inverter section comprises a pulse width modulation inverter using solid state switching devices connected in a three-phase bridge configuration to the DC bus 22 to develop power at the terminals U, V and W. The switches are pulse width modulated by control signals using a conventional control scheme. Particularly, the PWM inverter 24 is controlled to create a sinusoidal effect for the induction motor 16. The pulse frequency is typically fixed. The pulse width is varied to various sinusoidal frequency.

As will be apparent, the DC bus circuit 22 is not limited to use with any particular AC/DC converter and/or DC/AC converter.

Figure 1A:
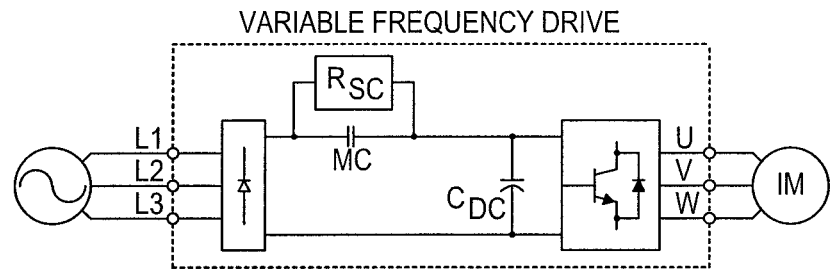
FIGS. 1(a) and 1(b) are generalized schematics of prior art variable frequency drives (VFDs) discussed above.
Figure 1B:
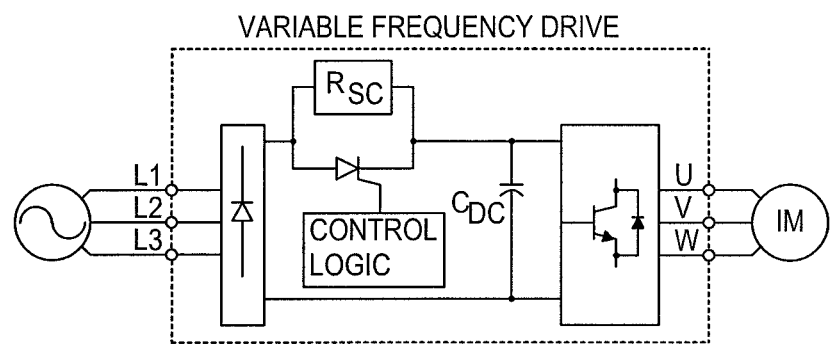

Traditionally, the soft charge resistor contactor arrangement is in series with the main DC path as shown in FIG. 1(a). The reason for this position especially in older VFDs that do not employ laminated bus structure, is that the alternate position in series with the DC bus capacitor as shown in FIG. 2 may end up having large inductance in the DC bus circuit. This can cause voltage spikes across the DC bus thereby influencing the overall performance of the inverter section. Older capacitor manufacturing techniques including material used did not yield optimal capacitor designs with low external series inductance (ESL). After the advent of laminated bus structure, the inductance in series with the DC bus capacitors was not an issue. An important motivation to move the contactor from its position in FIG. 1(a) to that in FIG. 2 is that the main DC current is inductive and during a brownout condition, opening the contactor is difficult to impossible. Moving it in series with the capacitor makes the current capacitive and can easily be opened during a brownout condition. This offers potential to incorporate intelligence into the contactor operation and perhaps replace it with controllable semiconductor device.

Due to higher ripple current handling capacity of electrolytic capacitors, VFDs even up to 45 kW rating are nowadays able to accommodate the capacitor banks on a PC board. The magnetic contactor is also mounted on the same PC board. Hence, the contactor interfering with the laminated bus structure does not arise for VFDs up to this size. By modifying the power traces on the PC board, the contactor can easily be moved from the location in FIG. 1(a) to that in FIG. 2. Such modification is simple and does not incur significant cost. In VFDs larger than 45 kW, the laminated bus structure is commonly used. ESL of modern-day capacitors are low and depending on the type of capacitor used, it can be even lower. The laminated bus structure can easily be constructed to accommodate the contactors contact positions. Hence, moving the contactor to the position shown in FIG. 2 is not a challenge.

The current rating of the soft charge resistor contactor depends on its location, either in the main DC current path of FIG. 1(a) or in the shunt path of FIG. 2. The current rating also depends whether the drive has a built-in DC link choke or has no DC link choke. Drives rated at 22 kW and lower typically do not have built-in DC link choke. The DC link choke $L_{dc}$ helps improve the input power factor and reduces the current ripple in the main DC bus capacitors thereby allowing the use of lower DC bus capacitance value.

In order to cover all cases, the case of VFDs with no DC link choke is considered first. In order to compute the main DC link current, the output power rating of the drive PRATED, is needed. Typical AC motor efficiency of 0.9 p.u. and drive efficiency of 0.97 p.u. is assumed. The needed DC bus power is then computed. Since there is no DC link in the drive under consideration, a typical input power factor of 0.6 is assumed to compute the AC current in each phase of the input. The input AC current is transformed to the DC bus side that has the equivalent DC component and the ripple. This true rms current is the desired contact rating of the contactor in the position shown in FIG. 1(a).

The ripple current flowing into the capacitor is the difference between the square of the true DC bus rms current and the square of the average DC bus current. The capacitor also has to carry the magnetizing current flowing into the AC motor which circulates between the DC bus capacitor and the AC induction motor. Based on the above discussions, the contactor rating when it is in position shown in FIG. 1(a) is compared to its rating when it is in position shown in FIG. 2 for the case with no DC link choke.

$$P_{DC} = \frac{P_{RATED}}{\eta_{MTR} \times \eta_{VFD}} \approx 1.145 \times P_{RATED} \quad (1)$$

-continued
$$I_{DC(avg)} = \frac{P_{DC}}{V_{DC}} = \frac{P_{DC}}{1.35 \times V_{LL}} \approx \frac{0.848 \times P_{RATED}}{V_{LL}}$$

$$I_{IN} = \frac{P_{DC}}{\sqrt{3} \times V_{LL} \times pf} \approx \frac{1.102 \times P_{RATED}}{V_{LL}}$$

$$I_{DC(rms)} = \sqrt{\frac{3}{2}} \times I_{IN} = \frac{1.35 \times P_{RATED}}{V_{LL}}$$

The contactor current rating when it is in position corresponding to that in FIG. 1(a) is given by (1). Typically, this number is multiplied by 1.5 or 1.75 to accommodate for overcurrent and other required design margins.

If the contactor is placed in the position shown in FIG. 2, then the contactor MC1 carries only the ripple current in the main DC bus 26. However, as mentioned earlier, the motor magnetizing current will need to be added vectorially to the ripple current. The motor power factor is assumed to be 0.8 in the following exercise. In addition, the input line to line voltage (VLL) is assumed to be the same as the motor rated voltage. This may not be true, but it helps to make an approximate comparison.

Similar to the typical practice mentioned earlier, the actual current rating of the contactor MC1 in position corresponding to that in FIG. 2 is 1.5 to 1.75 times the value given by equation (2).

$$I_{ripple(rms)} = \sqrt{I_{DC(rms)}^2 - I_{DC(avg)}^2} = \frac{1.05 \times P_{RATED}}{V_{LL}} \quad (2)$$

$$I_{mag(rms)} = \frac{0.6 \times P_{RATED}}{\sqrt{3} \times V_{LL}} = \frac{0.346 \times P_{RATED}}{V_{LL}}$$

$$I_{cap(rms)} = \sqrt{I_{ripple(rms)}^2 + I_{mag(rms)}^2} = \frac{1.105 \times P_{RATED}}{V_{LL}}$$

Comparing the values in equation (1) and (2), it is clear that for the case with no DC link choke, the contactor rating in position corresponding to FIG. 2 is lower than that in position corresponding to FIG. 1(a). In percentage terms, it calculates out to be 18% lower.

The above exercise is now repeated for the case when a DC link choke $L_{dc}$ is present in the drive. The value of the DC link choke $L_{dc}$ is assumed to be such that under rated load conditions, the true input power factor is around 0.93. All other assumptions remaining the same, the current rating of the contactor if placed in position shown in FIG. 1(a) is:

$$I_{IN} = \frac{P_{DC}}{\sqrt{3} \times V_{LL} \times pf} \approx \frac{0.711 \times P_{RATED}}{V_{LL}} \quad (3)$$

$$I_{DC(rms)} = \sqrt{\frac{3}{2}} \times I_{IN} = \frac{0.87 \times P_{RATED}}{V_{LL}}$$

The contactor current rating when it is in position shown in FIG. 1(a) for the case with a DC link choke is given by (3). As earlier, this number is multiplied by 1.5 or 1.75 to accommodate for overcurrent and other required design margins.

When the contactor is in the position shown in FIG. 2, the contactor current rating is recalculated for the case with a DC link choke $L_{dc}$. All assumptions made for this condition are the same as exercised earlier.

$$I_{ripple(rms)} = \sqrt{I_{DC(rms)}^2 - I_{DC(avg)}^2} = \frac{0.19 \times P_{RATED}}{V_{LL}} \quad (4)$$

$$I_{cap(rms)} = \sqrt{I_{ripple(rms)}^2 + I_{mag(rms)}^2} = \frac{0.39 \times P_{RATED}}{V_{LL}} \quad (5)$$

Comparing the values in equation (3) and (4), it is clear that for the case with a DC link choke $L_{dc}$, the contactor rating in position corresponding to FIG. 2 is lower than that in position corresponding to FIG. 1(a). In percentage terms, it calculates out to be around 55% lower.

The above observation is significant since it shows that in cases where multiple contacts are used in the DC bus especially with a DC link choke contactor rating can be reduced by 55% if it is moved to the position shown in FIG. 2. This significantly reduces the contactor current rating allowing only one contact to be used instead of two or more parallel contacts.

Figure 3:
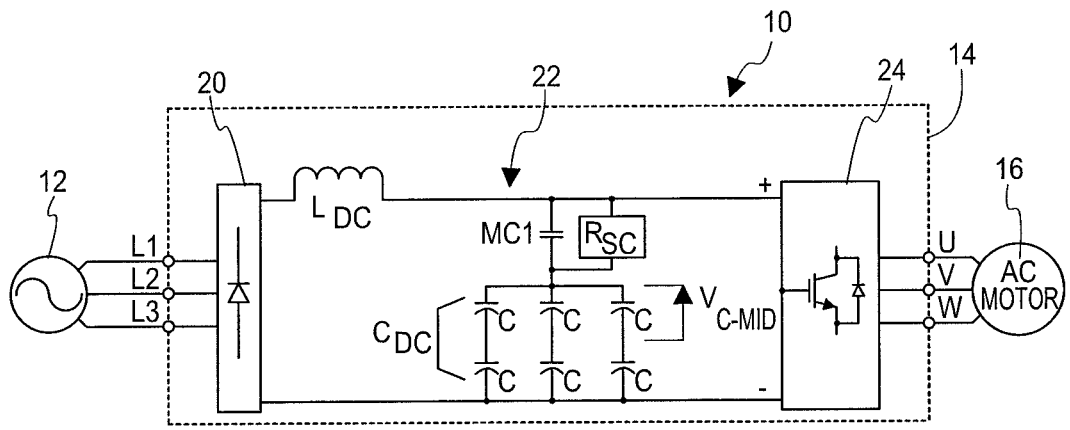
FIG. 3 is a schematic of a VFD similar to FIG. 2 with a DC bus common midpoint removed.

Referring to FIG. 3, the motor drive system 10 is similar to that of FIG. 2 but differs in removal of the DC bus capacitor $C_{dc}$ common midpoint.

UL has a requirement that all VFDs that seek the UL mark need to meet the component breakdown test. In this test half the DC bus capacitor is subject to a short condition after the VFD has been powered up and running an AC motor. The motivation behind this test is to identify the current path during the capacitor short circuit condition in order to identify weak spots, if any, that can result in catastrophic failure. The test involves wrapping the VFD with cotton and seeing if the cotton ignites when the capacitor is subject to a short.

In a typical VFD that has multiple capacitors in series and parallel, the midpoint of the capacitor network is connected to form one common midpoint, as in FIG. 2. Because of the common midpoint, subjecting one capacitor to a short results in the entire positive half or negative half of DC bus being subject to the short. This results in extremely high amounts of energy being removed from the entire half of the DC bus capacitors, resulting in an inrush current from the source that can exceed the i2t rating of the diodes in the VFD. This can cause a rupture of the diode module and can ignite the cotton wrapped around the VFD. Rupture of rectifier module following such tests is common, especially when the rectifier and the inverter parts are packaged into one semiconductor pack known as Converter Inverter Brake (CIB) module in the industry. In order to reduce the energy that is being removed from the DC bus, it is prudent to subject only one capacitor to the short. This would result in lowering the resulting inrush current to values that can be tolerated by diode rectifiers having appropriate i2t rating. In accordance with the invention, this is achieved by eliminating the midpoint connection between the capacitors in FIG. 2. The new capacitor configuration is shown in FIG. 3 and comprises three parallel branches of series connected capacitors C. As noted above, more than three parallel branches of series connected capacitors C could be included.

Removing the midpoint connection prevents an entire half of the DC bus being subject to a short during one capacitor short circuit test. To ensure equal voltage sharing, each capacitor may use a balancing resistor (not shown).

Simulation results for tests of the circuit in FIG. 3 are discussed by the inventors herein in a paper by M. Swamy and N. Seipel, "A Unique Way to Address Component Breakdown Guidelines Set in UL 61800-5-1 for Variable Frequency Drives," 2020 IEEE Energy Conversion Congress and Exposition (ECCE), Detroit, Mich., USA, October, 2020, pp. 2732-2739, the specification of which is incorporated by reference herein.

The simulation was carried out using real VFD parameters to quantify the effect of removing the DC bus common midpoint. The simulation indicated that just separating the common midpoint is not sufficient to limit the amount of energy flowing into the fault.

Figure 4:
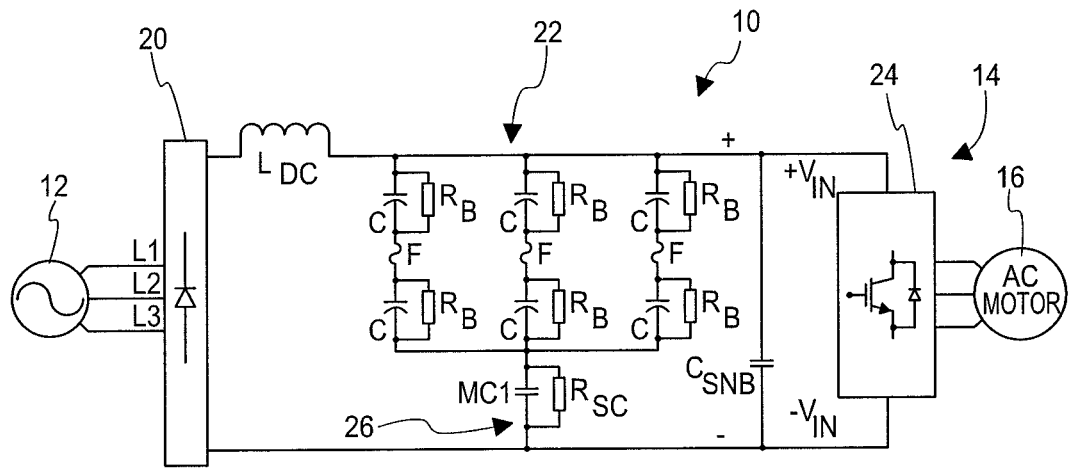
FIG. 4 is a schematic of a VFD similar to FIG. 3 with a fuse in each branch of the DC bus.

Referring to FIG. 4, the motor drive system 10 is similar to that of FIG. 3 and further introduces fuse protection in each of three capacitor branches. Each capacitor branch comprises a fuse F series connected between the capacitors C. A balancing resistor $R_B$ is connected across each capacitor C. In the circuit of FIG. 4, the soft charge circuit 26 is connected to the "−" rail. A snubber capacitor $C_{SNB}$ is connected across the DC Bus.

From the results obtained on performing capacitor short on only one capacitor in a given DC bus configuration, it is clear that just separating the capacitors is not sufficient to prevent case rupture and eventual ignition of cotton. Since it is necessary to accommodate low i2t rated rectifier sections in a typical CIB module configuration, it is prudent to provide extra protection to the capacitors in the DC bus. A cost-effective way of providing protection is to equip each pair of capacitors with an appropriately rated DC bus fuse. Such a method has been described in U.S. Pat. No. 7,054,173, although in the patent disclosure, the soft charge contactor is not in series with the DC bus capacitors.

The fuse rating depends on the capacitor current rating and can be selected to be 75% to 100% greater than the capacitor current rating. For a 230V rated drive, the typical maximum DC bus voltage does not exceed 400 Vdc. For such applications, the voltage rating of the DC bus capacitor branch fuse can be selected to be 500V. For a 460V rated drive, the typical maximum DC voltage does not exceed 800V. Each capacitor handles half the DC bus voltage and so each capacitor is rated for 400 Vdc. When the fuse opens, voltage across it can rise up to the DC bus voltage. A fuse rated at 1 kV should suffice for such applications. Ceramic fuses rated at 1 kV are available and offer a good option for low power applications that have integrated power module (CIB). In small VFDs, rated up to 460V, 45 kW, the DC bus capacitor bank is typically housed on a Printed Circuit Board (PCB) and can accommodate PCB mountable cartridge or pigtail style ceramic fuses.

The current rating of the fuse for use in the simulated drive rated at 460V, 30 kW (60 A) is computed next. The magnetizing current for this AC induction motor (40 hp, 460V) is assumed to be 50% of its NEC current rating. This computes to be 26 A. Since the tested drive has a built-in DC link choke, equation (4) is used to compute the capacitor ripple current.

$$I_{ripple(rms)} = \frac{0.19 \times P_{RATED}}{V_{LL}} = \frac{0.19 \times 30000}{460} = 12.4A \quad (5)$$

$$I_{cap(rms)} = \sqrt{I_{ripple(rms)}^2 + I_{mag(rms)}^2} = 28.8A$$

$$I_{Fuse(rms)} = 2 \times I_{cap(rms)} = 57.6A \approx 60A$$

To meet NEC regulations, the total capacitor current that the fuses have to handle is assumed to be 200% of the value in equation (5). Rounding it up to the next higher number, the total fuse rating is computed to be 60 A. Since in the illustrated drive, the capacitor network has three branches, three fuses are inserted, one in each branch. The current rating of the fuse in each branch is thus 60 A/3 or 20 A each.

Figure 5:
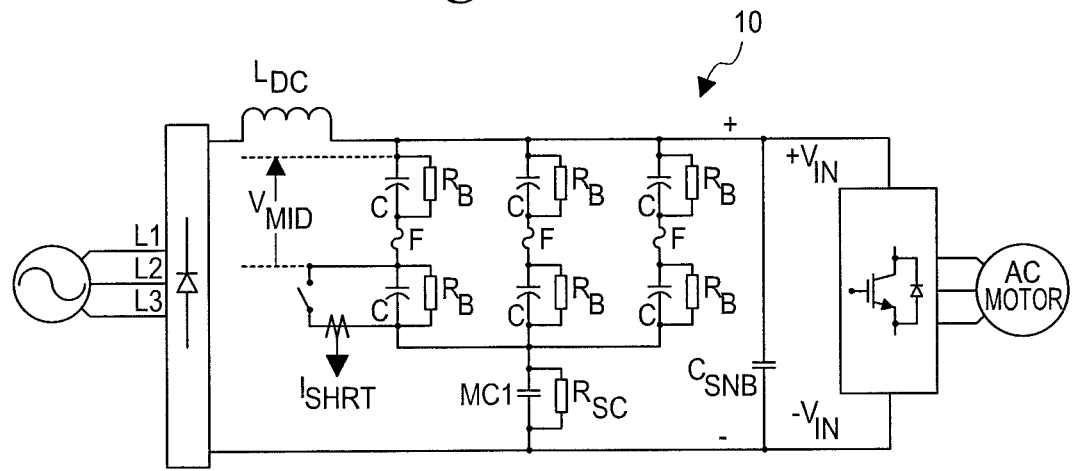
FIG. 5 is the schematic of FIG. 4 illustrating a short circuit test.

FIG. 5 shows the schematic of the fuse and capacitor arrangement used in the VFD that was subject to the capacitor short circuit test. Due to unavailability of 1 kV fuses at time of test, 500V, 20 A fuses were used. The soft charge contactor in FIG. 5 is shown connected to the negative bus for future ease of substituting it with a power semiconductor device.

The simulation showed no damage to the capacitors C. Only the fuse in the branch that was subject to the short opened. The other branch fuses remained intact and the VFD 14 kept running the motor 16 without faulting.

Details on the simulations are discussed in the paper discussed above and incorporated by reference herein.

Figure 6:
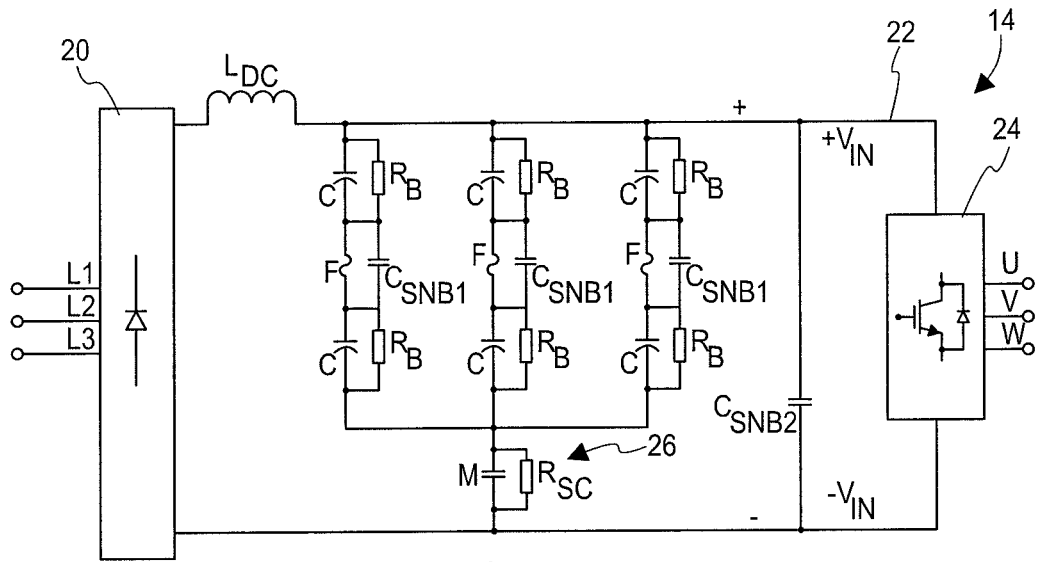
FIG. 6 is a schematic of a VFD similar to FIG. 4 with a snubber capacitor across each bus fuse.

Referring to FIG. 6, the VFD 14 is similar to that of FIG. 4 and further introduces a snubber capacitor $C_{SNB1}$ across each bus capacitor fuse F.

As noted above, in U.S. Pat. No. 7,054,173 the fuse is added in series with each capacitor branch. However, the soft charge resistor contactor is not in series with the DC bus capacitors. Simply adding fuse in series with the DC bus capacitor has drawbacks. When the fuse operates and one of the DC bus capacitors is disconnected from the bus, the capacitor voltage becomes nondeterministic. If the physical placement of the floating capacitor is near a metallic frame or a live bus bar, depending on the spacing, a potential flashover can happen. If there are only two parallel capacitor branches in the VFD and one capacitor branch is subject to a short, then the energy for the short will be provided by the healthy capacitor branch. This can cause the fuse in the healthy branch also to fail. This will lead to a situation where there is no capacitance across the DC bus. The capacitor current will suddenly cease to flow thereby creating a DC bus voltage surge that can damage IGBTs. The same is also true if there is only one branch of capacitor.

In accordance with the invention, a snubber type of capacitor $C_{SNB1}$ is connected across each fuse F in the topology. When one of the capacitors C is subject to a fault, see FIG. 7, the fuse F in the same branch opens and brings into the circuit the high voltage, low capacitance value snubber capacitor $C_{SNB1}$. This snubber capacitor $C_{SNB1}$ is connected in series with the healthy capacitor. The total capacitance value reduces and current flow into the short assumes a very low value. The voltage across the healthy surviving capacitor decays to a very low value since most of the voltage now appears across the newly formed series snubber capacitor $C_{SNB1}$. The healthy surviving capacitor is not floating and has a deterministic low voltage across it.

Figure 7:
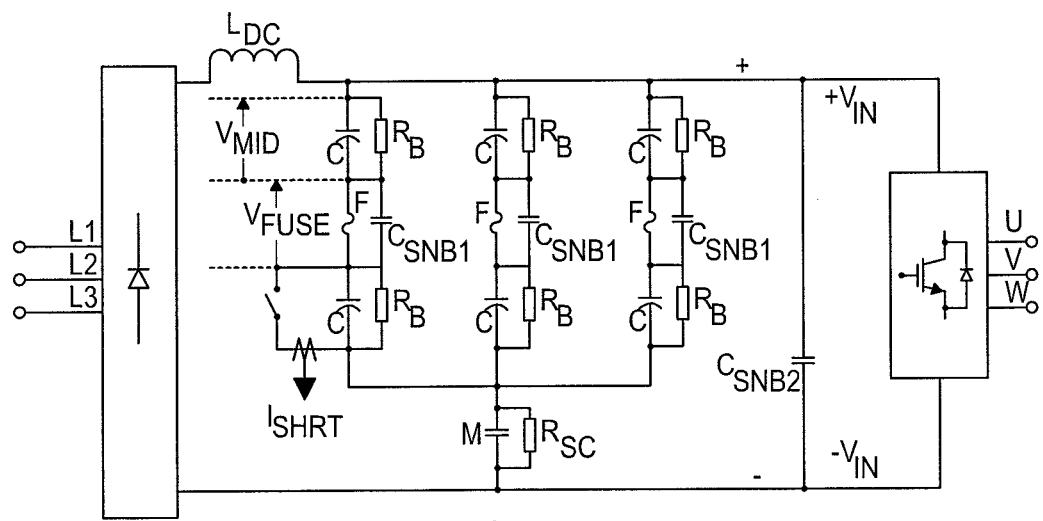
FIG. 7 is the schematic of FIG. 6 illustrating a short circuit test.

If the VFD 14 has only two capacitor branches it may be possible that both fuses open due to the initial high inrush current but each branch will end up having a reduced capacitance resulting in a total equivalent DC bus capacitance of non-zero value. The new snubber capacitor $C_{SNB1}$, if selected correctly, can prevent catastrophic voltage surge on the DC bus 22, thereby preventing damage to the IGBTs. In FIG. 7, the value of the snubber capacitor $C_{SNB1}$ across the fuses depends on the number of parallel capacitor branches present and the power rating of the VFD.

Once the fuse opens, the snubber capacitor $C_{SNB1}$ is placed in series with the healthy capacitor. Since the value of the snubber capacitor is expected to be in the range of a few hundreds of nano Farads, the voltage across this snubber capacitor $C_{SNB1}$ will be almost the same as the main DC bus voltage. For a 460V drive system, it will be around 650V. Typical snubber capacitors in such VFDs are rated at 1 kV or 1.1 kV. For a 230V drive system, this value is typically 500V or 600V. In the described system, a 1.1 kV snubber capacitor is selected.

As discussed above, the capacitance of the snubber capacitor $C_{SNB1}$ across each fuse F is important, especially when there is only one capacitor branch or there are only two parallel branches in the main DC bus 22. When there is only one branch, it is certain that the fuse in that branch opens and only the snubber capacitor $C_{SNB1}$ across the fuse and the external snubber $C_{SNB2}$ protects the IGBT module from experiencing high voltage swell when main DC bus current is interrupted. Similarly, when there are only two parallel capacitor branches, the probability of both fuses in the two parallel branches opening up when one half of one branch is subject to a short, is high. Under such conditions, it is important to limit the surge voltage to a safe level. The value of this surge voltage will depend on two important factors, namely, value of source inductance which depends on the available short circuit current rating; and the value of the DC link choke, if any.

The lower the value of the source short circuit current rating, the higher the surge voltage experienced across the DC bus since the source impedance is high under this condition. Similarly, presence of a DC link choke will result in a higher surge voltage across the main DC bus since the interruption of an inductive current results in a higher surge voltage. The current being interrupted when the fuse opens depends on the source voltage, source impedance, DC link choke impedance, and the value of the capacitance in the branch undergoing the short. This current can be calculated. The calculated value of the current being interrupted is used to compute the surge voltage across the DC link choke and the source impedance. These example calculations are performed in equation (6), below. The interrupting time is taken to be the melt i2t time for the selected fuse. The resulting swell in the voltage should be lower than the snubber voltage rating or the IGBT voltage rating, whichever is lower. If the swell in voltage is higher than the component rating, it is important to limit the surge voltage by using a higher value of snubber capacitor in the form of $C_{SNB1}$ across the fuses. The above-described approach is adopted for the tested system in FIG. 7, the details for which are in the following table:

| Item | Rating |
| --- | --- |
| VFD Rating | 460 V, 30 kW (Normal Duty) 60A |
| Capacitor Configuration (FIG. 2) | 2 Series, 3 Parallel |
| Capacitor Rating | 1130 µF, 400 V |
| Effective Capacitance, CDC | 1695 µF, 800 V |
| ESR of each capacitor | 0.03-Ohms |
| DC Link Choke Rating | 0.63 mH, 75A |
| Winding Resistance | 0.04-Ohms |
| Source Inductance, LS | 0.0155 mH |
| Source Resistance (X/R = 1) | 0.0059-Ohms |

$$Z = \sqrt{\frac{(L_{DC} + (2 \times L_S))}{C}} = \sqrt{((0.63 + 0.033) \times 10^3)/1130} = 0.766\Omega \quad (6)$$

$$I_{M(Interrupt)} = \frac{\sqrt{2} \times V_{LL}}{Z} = \frac{650.5}{0.766} = 849.26A$$

$$V_{SURGE} = V_{DC} + \left((L_{DC} + (2 \times L_S)) \times \frac{I_{M(Interrupt)}}{t_{Fuse-Melt}}\right) =$$

$$650 + \left(0.663 \times \frac{849.26}{1.6}\right) = 1001.9 \text{ V}$$

It should be noted that the melt i2t timing is gathered from tests and was seen to be around 1.6 ms. Inductance values are in mH. In the unit tested, there are three parallel branches and the probability of all capacitor fuses being opened is very rare. In addition, the rated snubber capacitor voltage value is 1.1 kV and the IGBTs used are rated at 1.2 kV. Hence, there is no need to pay extra attention to the value of the capacitors $C_{SNB1}$ that needs to be used. An appropriate value of 0.22 micro Farad, 1.1 kV should suffice. The test results from this are discussed in the paper discussed above and incorporated by reference herein.

The following important observations are made from the test results of this example configuration:

The initial shorting current is mainly due to the discharge of the capacitor being shorted. Current also flows from the other two adjoining parallel branches but this current is equally divided by the two branches and so their respective fuses do not open.

After the first discharge, current from the input starts flowing into the short. The rectified value of the input AC current is seen to flow as reflected in $I_{SHRT}$, the peak value of which is 600 A.

The maximum value of voltage across the top capacitor in the branch being shorted goes to the full DC bus voltage of around 650V. No swell is observed since the remaining two capacitor branches are able to absorb the swell.

The voltage across $C_{SNB1}$, same as the voltage across the fuse, charges up to the DC bus voltage in a typical RC fashion and at the same time, the voltage across the upper bulk capacitor in series with $C_{SNB1}$, decays to zero thereby assuring safe voltage across both the capacitors as desired by design.

The drive does not fault out and the load motor keeps running since the load is low enough to be handled by the remaining two parallel capacitor branches.

In order to meet the UL directive, significant changes to the DC bus structure are described herein. The proposed circuit modifications and the effect of each on the overall performance are listed:

1. Move the magnetic contactor (MC1) in series with the bus capacitor—this helped reduce the number of contacts in parallel, reduced size of the contactor and cost, especially when the drive has a built-in DC link choke. Did not alter the half DC bus short condition;

2. Remove the DC bus common midpoint—this helped reduce the energy in the short but other countermeasures in combination with this topology change may be required to prevent fire, especially in VFDs that have CIB module;

3. Fuse each separated branch of the DC bus—this is effective but resulted in floating voltage across the top open capacitor in branch undergoing short; and 4. Add a snubber capacitor across each bus fuse—the performance of this topology is preferred since the voltage across the snubber capacitor was deterministic and that across the top capacitor decayed to zero.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, other components may be added to, or removed from, the described systems. Other embodiments may be within the scope of the following claims.

The invention claimed is:

1. A voltage source inverter comprising:
   a rectifier circuit having an input for connection to a multi-phase AC power source and converting the AC power to DC power;
   an inverter circuit for receiving DC power and converting the DC power to AC power; and
   a DC bus circuit connected between the rectifier circuit and the inverter circuit to provide a relatively fixed DC voltage for the inverter circuit, the DC bus circuit comprising a DC bus including a first bus rail comprising an inductor and a second bus rail, and a soft charge circuit connected in series with a DC bus capacitor network between the first and second rails, the DC bus capacitor network comprising a plurality of parallel pairs of series connected capacitors.

2. The voltage source inverter of claim 1 wherein the DC bus capacitor network comprises two parallel pairs of series connected capacitors.

3. The voltage source inverter of claim 1 wherein the DC bus capacitor network comprises three or more parallel pairs of series connected capacitors.

4. The voltage source inverter of claim 1 wherein each pair of series connected capacitors comprises a midpoint and the midpoint of each pair is connected to form a common midpoint.

5. The voltage source inverter of claim 1 wherein each pair of series connected capacitors comprises a midpoint and the midpoint of each pair is not connected to the midpoint of the other pairs.

6. The voltage source inverter of claim 1 wherein each pair of series connected capacitors comprises a fuse connected in series between the capacitors.

7. The voltage source inverter of claim 6 wherein the DC bus capacitor network further comprises a plurality of balancing resistors and wherein each balancing resistor is connected across one of the capacitors.

8. The voltage source inverter of claim 7 wherein the DC bus capacitor network further comprises a plurality of snubber capacitors and wherein each snubbing capacitor is connected across one of the fuses.

9. A voltage source inverter comprising:
   a rectifier circuit having an input for connection to a multi-phase AC power source and converting the AC power to DC power;
   an inverter circuit for receiving DC power and converting the DC power to AC power; and
   a DC bus circuit connected between the rectifier circuit and the inverter circuit to provide a relatively fixed DC voltage for the inverter circuit, the DC bus circuit comprising a DC bus including a first bus rail comprising an inductor and a second bus rail, and a soft charge circuit connected in series with a DC bus capacitor network between the first and second rails, the DC bus capacitor network comprising a first capacitor branch including a pair of capacitors with a fuse connected in series between the capacitors, a balancing resistor across each capacitor and a snubbing capacitor connected across the fuse.

10. The voltage source inverter of claim 9 wherein the DC bus capacitor network further comprises a second capacitor branch in parallel with the first capacitor branch.

11. The voltage source inverter of claim 10 wherein the DC bus capacitor network further comprises at least a third capacitor branch in parallel with the first and second capacitor branches.

12. A variable frequency drive comprising:
- a diode rectifier receiving multi-phase AC power from a source and converting the AC power to DC power;
- an inverter for receiving DC power and converting DC power to AC power to drive a load;
- a DC bus connected between the diode rectifier and the inverter to provide a relatively fixed DC voltage for the inverter; and
- a soft charge circuit connected in series with a DC bus capacitor network across the DC bus, the DC bus capacitor network comprising a plurality of parallel pairs of series connected capacitors.

13. The variable frequency drive of claim 12 wherein the DC bus capacitor network comprises two parallel pairs of series connected capacitors.

14. The variable frequency drive of claim 12 wherein the DC bus capacitor network comprises three or more parallel pairs of series connected capacitors.

15. The variable frequency drive of claim 12 wherein each pair of series connected capacitors comprises a midpoint and the midpoint of each pair is connected to form a common midpoint.

16. The variable frequency drive of claim 12 wherein each pair of series connected capacitors comprises a midpoint and the midpoint of each pair is not connected to the midpoint of the other pairs.

17. The variable frequency drive of claim 12 wherein each pair of series connected capacitors comprises a fuse connected in series between the capacitors.

18. The variable frequency drive of claim 17 wherein the DC bus capacitor network further comprises a plurality of balancing resistors and wherein each balancing resistor is connected across one of the capacitors.

19. The variable frequency drive of claim 18 wherein the DC bus capacitor network further comprises a plurality of snubber capacitors and wherein each snubbing capacitor is connected across one of the fuses.

* * * * *